3,812,114
BENZOTHIAZINES
John Krapcho, Somerset, N.J., assignor to E. R. Squibb & Sons, Inc., Princeton, N.J.
No Drawing. Filed Sept. 29, 1971, Ser. No. 184,954
Int. Cl. C07d 93/10
U.S. Cl. 260—243 R    9 Claims

ABSTRACT OF THE DISCLOSURE

Compounds of the formula

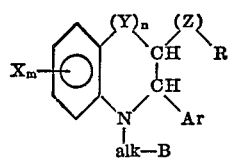

wherein X may be hydrogen, halogen, alkyl, haloalkyl, alkoxy, haloalkoxy, hydroxy, alkylthio, haloalkylthio, nitro, alkylsulfonyl, amino, alkanoylamino, or mono- or dialkylamino wherein any of the foregoing alkyl or substituted alkyl radicals may contain up to 8 carbon atoms; m may be 1, 2, 3 or 4; Y may be —S—, —SO—, —SO$_2$—, n may be 0 or 1; alk may be a straight or branched alkyl radical of up to 6 carbon atoms; B may be a basic nitrogen containing radical; R may be straight or branched alkyl radical of from 1 to 8 carbon atoms, cycloalkyl of from 3 to 8 carbon atoms, or aryl or arylalkyl of from 6 to 10 carbon atoms; Z may be

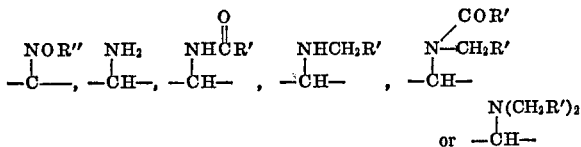

wherein R" may be hydrogen, alkyl of from 1–4 carbons or acyl of from 1–4 carbons; R' may be hydrogen or alkyl of from 1 to 4 carbons; Ar may be phenyl, X-substituted phenyl, wherein X is as defined above, pyridyl, thienyl, furyl, naphthyl, or alkylenedioxyphenyl; and pharmaceutically acceptable acid-addition or quaternary ammonium salts thereof and N-oxides and pharmaceutically acceptable acid-addition salts thereof, are useful as anti-inflammatory agents.

OBJECTS OF THE INVENTION

It is an object of the present invention to provide new anti-inflammatory agents. Another object is to provide a method for preparing these compounds. These and other objects of the present invention will be apparent from the following description.

DETAILED DESCRIPTION

The compounds of the present invention may be prepared according to the following reaction sequence:

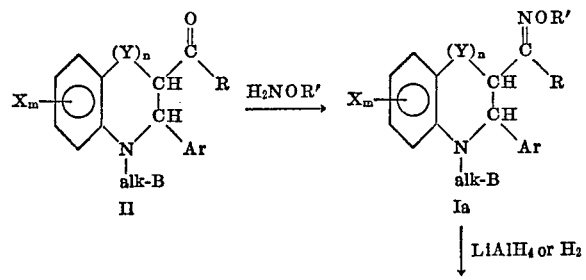

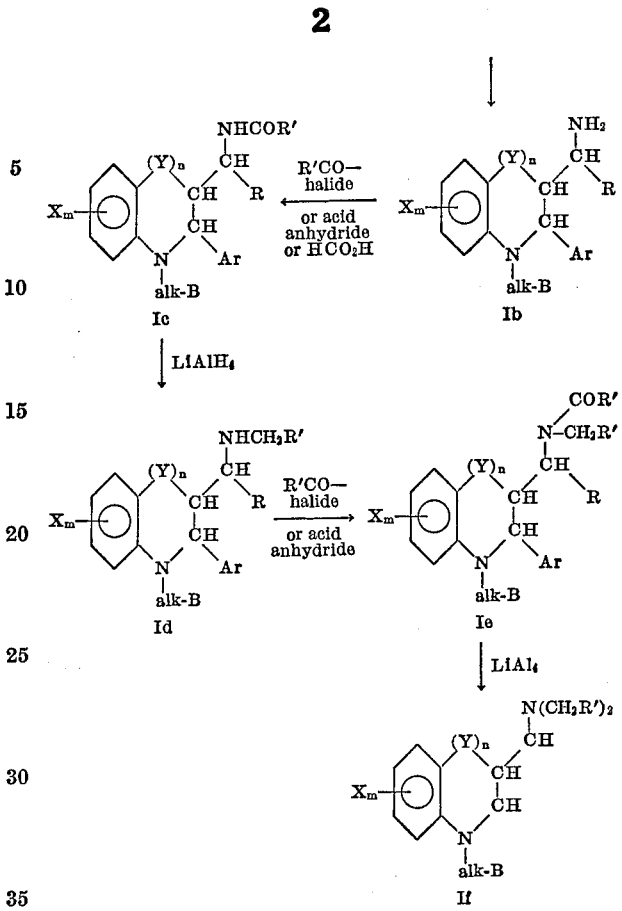

In the foregoing reaction sequence, X, m, Y n, alk, B, Ar, R and R' are as previously defined.

A compound of formula Ia may be prepared by reacting a compound of formula II with hydroxylamine or an alkyl-substituted hydroxylamide wherein the alkyl radical has from 1 to 4 carbon atoms. This reaction may take place in the presence of a polar solvent such as, for example, pyridine or aqueous ethanol in the presence of a base, e.g. NaOH or KOH. The reaction may be carried out with refluxing for about 1 to about 4 hours. Compounds wherein R' is acyl may be prepared by reacting the compound of formula Ia wherein R' is hydrogen with an acyl halide or an acid anhydride wherein the acyl radical may contain from 1 to 4 carbon atoms. This reaction may be carried out by refluxing in a polar solvent such as, for example, pyridine, for about 1 to about 4 hours.

The compound of formula Ib may be obtained by treating the compound of formula Ia, wherein R' is hydrogen, with a reducing agent such as, for example, LiAlH$_4$ in a solvent such as tetrahydrofuran or ether, or catalytic hydrogenation in a solvent such as ethanol. The reaction may take place at room temperature or with heating for about 1 to about 4 hours.

A compound of formula Ic may be prepared by reacting a compound of formula Ib with an acyl halide or an acid anhydride. This reaction may be carried out by refluxing in a polar solvent such as, for example, chloroform, benzene, toluene, xylene or pyridine for from about 1 to about 4 hours. When R' is hydrogen, a compound of formula Ic may be prepared by refluxing a compound of formula Ib with excess formic acid for from about 1 to about 4 hours.

A compound of formula Ie may be obtained by treating a compound of formula Id with an acyl halide wherein R' is alkyl of from 1 to 4 carbons in the manner described above.

A compound of formula If may be obtained by treating a compound of formula Ie with a reducing agent such as, for example, LiAlH₄ as described above. When R' is hydrogen, a compound of formula If may also be prepared by treating a compound of formula Ib with formaldehyde and formic acid and heating to from about 75° to about 100° C. for from about 2 to about 10 hours.

The starting compounds of Formula II may be prepared as described in my copending U.S. patent application, Ser. No. 35,590, filed May 7, 1970, now U.S. Pat. No. 3,746,706. The preparation of intermediates for the compounds of formula II is known and is disclosed, for example, in my copending U.S. applications Ser. No. 157,678, filed June 28, 1971, and Ser. No. 160,066, filed July 6, 1971, now U.S. Pat. 3,733,321.

A. When Y is sulfur and n is 1, the compounds of formula II may be prepared by reacting an o-aminobenzene thiol or an X-substituted o-aminobenzenethiol of formula III with a haloacetic acid, and reacting a resulting thiazinone of formula IV with a haloalkylene-B compound to yield a compound of formula V. The latter is then treated with an aryl aldehyde to yield a corresponding compound of formula VI, which on reaction with a Grignard reagent of the formula RMghal yields the compound of formula VII. Reaction of the latter with an aqueous ammonium halide yields a compound of formula II-1. Alternatively, the compound of formula IV may be reacted with the aryl aldehyde to yield a compound of formula VIII which is then reacted with a haloalkylene-B compound to yield the compound of formula VI.

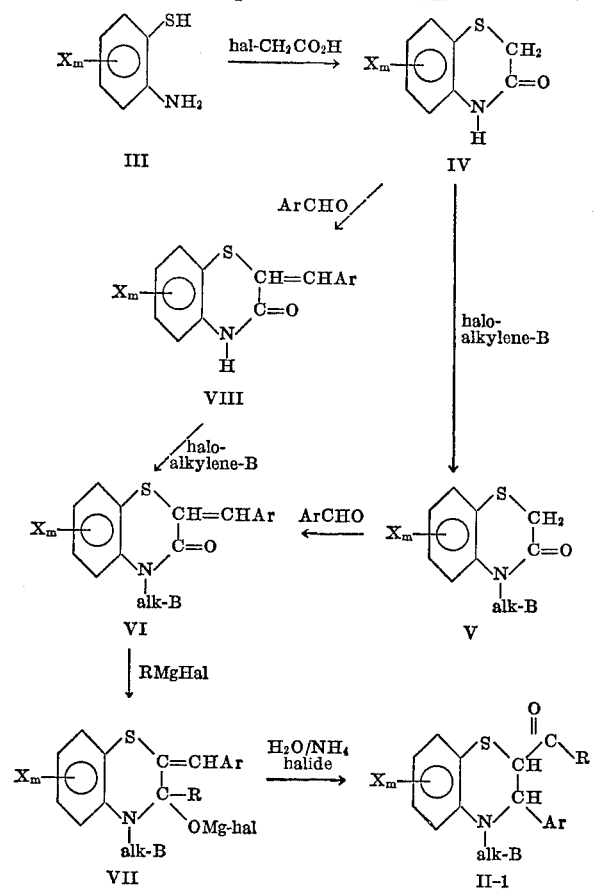

Examples of suitable o-aminobenzenethiols which may be used as starting material in the foregoing reaction sequence are the following:

2-aminobenzenethiol;
4-fluoro-2-aminobenzenethiol;
5-fluoro-2-aminobenzenethiol;
3,5,6-trifluoro-2-aminobenzenethiol;
3,4,5,6-tetrafluoro-2-aminobenzenethiol;
4-chloro-2-aminobenzenethiol;
5-chloro-2-aminobenzenethiol;
6-chloro-2-aminobenzenethiol;
5-bromo-2-aminobenzenethiol;
5-methyl-2-aminobenzenethiol;
6-methyl-2-aminobenzenethiol;
5-ethyl-2-aminobenzenethiol;
5-n-propyl-2-aminobenzenethiol;
5-n-hexyl-2-aminobenzenethiol;
3-hydroxy-2-aminobenzenethiol;
5-methoxy-2-aminobenzenethiol;
3,4-dimethoxy-2-aminobenzenethiol;
5-ethoxy-2-aminobenzenethiol;
5-n-propoxy-2-aminobenzenethiol;
5-n-hexyloxy-2-aminobenzenethiol;
4-ethylthio-2-aminobenzenethiol;
4-(trifluoromethyl)-2-aminobenzenethiol;
5-(trifluoromethyl)-2-aminobenzenethiol;
6-(trifluoromethyl)-2-aminobenzenethiol;
5-(trifluoromethoxy)-2-aminobenzenethiol;
4-(trifluoromethylmercapto)-2-aminobenzenethiol;
5-(trifluoromethylmercapto)-2-aminobenzenethiol;
5-nitro-2-aminobenzenethiol;
6-nitro-2-aminobenzenethiol;
2,4-diamino-5-methylthiophenol;
5-dimethylamino-2-aminobenzenethiol;
4-methylsulfonyl-2-aminobenzenethiol.

B. When a sulfoxide or sulfonyl, the compounds of formula II may be prepared by oxidizing the bivalent sulfur compound of formula II-1 (wherein Y is S) to the corresponding sulfoxide or sulfonyl. The techniques for such oxidations involve the use of H₂O₂ and KMnO₄, respectively, and are well known in the art. Alternatively, there may be employed a chloroform solution containing m-chloroperbenzoic acid. The sulfoxide of formula II-6 may be obtained by treating a compound of formula II-1 for from about 2 to about 24 hours at room temperature with one equivalent of m-chloroperbenzoic acid; the sulfone of formula II-7 may be obtained by treating a compound of formula II-1 with two equivalents of m-chloroperbenzoic acid for the same time at room temperature, or for a shorter time with slight heating.

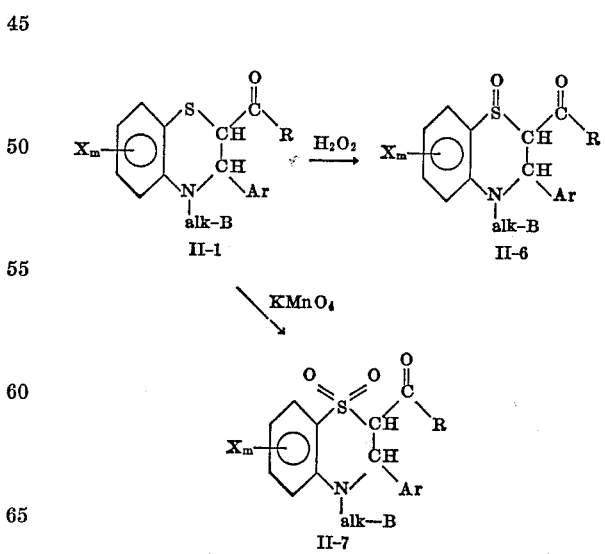

The alkyl radical alk may be a straight or branched carbon chain of up to 6 carbon atoms. Examples of such radicals are the following: methyl, ethyl, n-propyl, i-propyl, n-butyl, i-butyl, t-butyl, n-pentyl, 2-methyl-n-butyl, neopentyl, n-hexyl, 2-methyl-n-pentyl, 3-methyl-n-pentyl, 2,2-dimethyl-n-butyl, and 2,3-dimethyl-n-butyl.

Among the suitable radicals represented by the basic nitrogen containing radical B are the following:

amino;
(lower alkyl)amino (e.g., N-methylamino);
di(lower alkyl)amino (e.g., N,N-dimethylamino);
(hydroxy lower alkyl)amino;
(hydroxy lower alkyl) (lower alkyl)amino (e.g., N-2-hydroxyethyl-N-methtylamino);
di(hydroxy lower alkyl)amino;
phenyl(lower alkyl)amino;
N-phenyl lower alkyl (lower alkyl)amino; and saturated 5- to 7-membered monocyclic heterocyclic radicals of less than twelve carbon atoms, as exemplified by:
piperidino;
(lower alkyl)piperidino;
di(lower alkyl)piperidino;
(lower alkoxy)piperidino;
homopiperidino;
2-, 3-, or 4-piperidyl;
2-, 3-, or 4-(N-lower alkylpiperidyl);
pyrrolidino;
(lower alkyl)pyrrolidino;
di(lower alkyl)pyrrolidino;
(lower alkoxy)pyrrolidino;
2- or 3-pyrrolidyl;
2- or 3-(N-lower alkyl pyrrolidyl);
morpholino;
(lower alkyl)morpholino;
di(lower alkyl)morpholino;
(lower alkoxy)morpholino;
thiamorpholino;
(lower alkyl)thiamorpholino;
di(lower alkyl)thiamorpholino;
(lower alkoxy)thiamorpholino;
piperazino;
4-R-substituted piperazino (e.g., $N^4$-ethylpiperazino, $N^4$-phenylpiperazino, and so forth);
di(lower alkyl)amino-(lower alkyl)piperazyl (e.g., $N^4$-dimethylaminoethylpiperazino);
(lower alkyl)-piperazino (e.g., $N^4$-methylpiperazino);
di(lower alkyl)piperazino;
(lower alkoxy)piperazino;
homopiperazino;
and 4-R-substituted homopiperazino e.g., $N^4$-benzylhomopiperidino.

The lower alkyl and substituted lower alkyl radicals in the foregoing basic nitrogen containing radicals, B, may contain up to 6 carbon atoms.

The radical R may be a straight or branched alkyl radical of from 1 to 8 carbon atoms, cycloalkyl of from 3 to 8 carbon atoms, or aryl or arylalkyl of from 6 to 10 carbon atoms. Examples of alkyl radicals are, in addition to those mentioned previously for the radical alk, n-heptyl, 2-methyl-n-hexyl, 3-methyl-n-hexyl, 2,2-dimethyl-n-pentyl, 2,3-dimethyl-n-pentyl, 2,4-dimethyl-n-pentyl, 3,3-dimethyl-n-pentyl, 3-ethyl-n-pentyl, 2,2,3-trimethylbutyl, n-octyl, 2-methyl-n-heptyl, 3-methyl-n-heptyl, 4-methyl-n-heptyl, 2,3-dimethyl-n-hexyl, 2,4-dimethyl-n-hexyl, 2,5-dimethyl-n-hexyl, 2,2-dimethyl-n-hexyl, 3,3-dimethyl-n-hexyl, 2-ethyl-n-hexyl, 3-ethyl-n-hexyl, 2,2,3-trimethyl-n-pentyl, 2,2,4-trimethyl-n-pentyl, 2,3,3-trimethyl-n-pentyl, 2,3,4-trimethyl-n-pentyl, 2-ethyl-3-methyl-n-pentyl, 2-methyl-3-ethyl-n-pentyl, or 2,2,3,3-tetramethyl-n-butyl.

The cycloalkyl radical R may be, for example, cyclopropyl, 2-methylcyclopropyl, cyclobutyl, 2-methylcyclobutyl, 2-ethylcyclobutyl, cyclopentyl, 3-methylcyclopentyl, 3-ethylcyclopentyl, cyclohexyl, 4-methylcyclohexyl, cycloheptyl, 1-methylcycloheptyl, or cyclooctyl.

When R is aryl it may be the same as the radical Ar, that is, phenyl, X-substituted phenyl wherein X is as defined above, pyridyl, thienyl, furyl, naphthyl or alkylenedioxyphenyl.

When R is arylalkyl, it may be, for example, benzyl, phenethyl, isopropylphenyl, 3-phenylpropyl, or isopropylbenzyl.

Examples of suitable benzaldehydes which may be employed as the source of the aryl radical Ar are the following:

o-chlorobenzaldehyde;
p-chlorobenzaldehyde;
p-fluorobenzaldehyde;
2,4-dibromobenzaldehyde;
2,4-dichlorobenzaldehyde;
2,6-dichlorobenzaldehyde;
2-bromo-4-chlorobenzaldehyde;
2,3,4,5,6-pentafluorobenzaldehyde;
2-hydroxybenzaldehyde (salicylaldehyde);
3-hydroxybenzaldehyde;
4-hydroxybenzaldehyde;
2,4-dihydroxybenzaldehyde (β-resorcylaldehyde);
2,5-dihydroxybenzaldehyde (gentisaldehyde);
3,4-dihydroxybenzaldehyde;
2-chloro-3-hydroxybenzaldehyde;
2-chloro-5-hydroxybenzaldehyde;
2-bromo-3-hydroxybenzaldehyde;
3-hydroxy-6-iodobenzaldehyde;
2,6-dichloro-3-hydroxybenzaldehyde;
4,6-dichloro-3-hydroxybenzaldehyde;
2,4,6-trichloro-3-hydroxybenzaldehyde;
2,4-dichloro-3-hydroxy-6-bromobenzaldehyde;
2-nitrobenzaldehyde;
3-nitrobenzaldehyde;
4-nitrobenzaldehyde;
3-hydroxy-4-nitrobenzaldehyde;
2-nitro-3-hydroxybenzaldehyde;
2-nitro-5-hydroxybenzaldehyde;
3-nitro-4-chlorobenzaldehyde;
2-methylbenzaldehyde (o-toluylaldehyde);
3-methylbenzaldehyde (m-methylbenzaldehyde);
4-methylbenzaldehyde (p-methylbenzaldehyde);
2-hydroxy-5-methylbenzaldehyde (homosalicylaldehyde);
2-hydroxy-3,5,6-trimethylbenzaldehyde;
2-methoxybenzaldehyde (o-anisaldehyde);
3-methoxybenzaldehyde;
4-methoxybenzaldehyde (p-anisaldehyde);
4-butoxybenzaldehyde;
2-hydroxy-3-methoxybenzaldehyde;
3,4-dimethoxybenzaldehyde (vertraldehyde);
3,4,5-trimethoxybenzaldehyde;
3-methoxy-4-hydroxybenzaldehyde (vanillin);
3-trifluoromethylbenzaldehyde;
3-methylthiobenzaldehyde;
4-ethylthiobenzaldehyde;
4-dimethylaminobenzaldehyde;
3,4-methylenedioxybenzaldehyde (piperonal);
3,4-ethylenedioxybenzaldehyde.

In addition to benzaldehydes, other aryl aldehydes which may be used in carrying out the present invention are 2-pyridinecarboxaldehyde, 3-pyridinecarboxaldehyde, 4-pyridinecarboxaldehyde, 2-thienylcarboxaldehyde, 3-thienylcarboxaldehyde, α-furfural, α-naphthaldehyde, and β-naphthaldehyde.

The compounds of the invention may be obtained as mixtures of diasteroisomeric compounds when they contain more than one asymmetric atom. Such mixtures of racemates can then be separated into individual racemic compounds.

As to the salts, those coming within the purview of this invention include the acid-addition salts, particularly the pharmaceutically acceptable acid-addition salts, N-oxides and pharmaceutically acceptable acid-addition salts of N-oxides, and pharmaceutically acceptable quaternary ammonium salts. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids such as maleic, fumaric, tartaric, citric, acetic, benzoic, 2-acetoxybenzoic, salicylic, succinic acid, theophylline, 8-chlorotheophylline, p-aminobenzoic, p-acetamidobenzoic, nicotinic, methanesulfonic or cyclohexanesulfamic.

The N-oxide may be formed by dissolving the free base of formula I in a solvent inert to hydrogen peroxide, e.g., acetic acid, ethanol or chloroform, adding excess (on a molar basis) hydrogen peroxide, and allowing the mixture to stand at room temperature for several hours. An accid-addition salt of the N-oxide may be formed by addition of the desired acid, for example, those mentioned above.

The quaternary ammonium salts include those formed with alkyl halides (e.g., methyl chloride, isobutyl bromide, dodecyl chloride and cetyl iodide), benzyl halides (e.g., benzyl chloride) and dilower alkyl sulfates (e.g., dimethyl sulfate).

The compounds of this invention are useful as anti-inflammatory agents and are effective in the prevention and inhibition of granuloma tissue formation in warm blooded animals, for example in a manner similar to phenylbutazone or indomethacin. They may be used to decrease joint swelling, tenderness, pain and stiffness in mammalian species, e.g., in conditions such as rheumatoid arthritis. The compounds of this invention or a physiologically acceptable acid-addition salt thereof may be compounded according to accepted pharmaceutical practice for administration orally or by injection. Suitable oral dosage forms are tablets, capsules, elixirs, or powders, while solutions or suspensions are suitable for injection. The quantity administered may be from about 25 mg. to about 2 gm. per day, and preferably from about 50 mg. to about 200 mg. per day.

The following examples illustrate the invention without, however, limiting the same thereto. All temperatures given are in degrees centigrade unless otherwise stated.

EXAMPLE 1

2 - acetyl - 4 - [2 - (dimethylamino)ethyl]3,4-dihydro-3-phenyl-2H-1,4-benzothiazine, oxime, hydrochloride A solution of 17.7 g. (0.052 mole) of 2-acetyl-4-[2-(dimethylamino)ethyl] - 3,4 - dihydro - 3 - phenyl-2H-benzothiazine in 65 ml. of pyridine is treated at room temperature with 7.3 g. (0.105 mole) of hydroxylamine hydrochloride. The temperature rises to 37° and a solid separates. After stirring at 95° for 3.5 hours, the mixture is kept overnight at room temperature.

The solid is collected, washed with some pyridine, then with ether, and air-dried; wt., 11.5 g.; M.P. 231–233° (dec.). The IR spectrum indicates the material to be the hydrochloride of the desired oxime. Crystallization from 350 ml. of methanol gives 8.5 g. of colorless product; M.P. 231–233° (dec.).

EXAMPLE 2

2 - acetyl - 4 - [2 - (dimethylamino)ethyl]-3,4-dihydro-3-phenyl - 2H - 1,4 - benzothiazine, methyloxime, hydrochloride Eighteen grams (0.053 mole) of 2-acetyl-4-[2-(dimethylamino)ethyl] - 3,4 - dihydro - 3 - phenyl-2H-1,4-benzothiazine are dissolved in 65 ml. of pyridine, treated with 8.9 g. (0.107 mole) of methoxyamine hydrochloride and the mixture heated at 95° for 3.5 hours. After standing overnight at room temperature, the solution is diluted with 600 ml. of ether to precipitate a yellow oil which becomes partly crystalline when kept in the cold room for several hours. The liquor is decanted and the materials is triturated with 100 ml. of boiling butanone to give a tan solid. After cooling overnight, the product is filtered; wt., 18 g.; M.P. 170–175° (s. 130°). Crystallization from 150 ml. of acetonitrile (Darco-treated) yields 7.3 g. of colorless product; M.P. 208–210° (dec.).

EXAMPLE 3

2 - acetyl - 4 - [3 - dimethylamino)propyl]-3,4-dihydro-3-phenyl-2H-1,4-benzothiazine, oxime, hydrochloride Ten grams (0.028 mole) of 2-acetyl-4-[3-(dimethylamino)propyl - 3 - phenyl-2H-1,4-benzothiazine (crystallized from hexane; M.P. 87–89°) and 4 grams (0.058 mole) of hydroxylamine hydrochloride are reacted in 35 ml. of pyridine as described in Example 1. Since the product does not separate, the cooled solution is diluted with 400 ml. of ether to precipitate an oil which gradually becomes crystalline on rubbing and cooling overnight; crude yield, 12 g.; M.P. 172–174°. Crystallization from 120 ml. of absolute alcohol gives 8.2 g. of colorless solid; M.P. 210–212° (dec.).

EXAMPLE 4

2 - (1 - aminoethyl) - 4 - [3-(dimethylamino)propyl]-3,4-dihydro - 3 - phenyl-2H-1,4-benzothiazine, dihydrochloride, isopropyl alcohol solvate (1:1)

A solution of 6.0 g. (0.015 mole) of the free base of Example 3 (liberated from the HCl salt with $K_2CO_3$ and extracted with ether) in 100 ml. of THF is added dropwise to a stirred suspension of 1.7 g. (0.045 mole) of $LiAlH_4$ in 100 ml. of THF. The temperature gradually rises to 35°. After stirring overnight at room temperature, the mixture is cooled in ice, treated dropwise with 4 ml. of $H_2O$, followed by a solution of 0.8 g. of NaOH in 5 ml. of $H_2O$, and, finally, 2 ml. of $H_2O$. After stirring for 2 hours at 5–10°, the solid is filtered, washed well with ether, the combined filtrates dried ($MgSO_4$, and the solvent evaporated to give 4.8 g. of base. The latter is dissolved in 200 ml. of ether and treated with 100 ml. of ether containing 1.7 ml. of 7.8 N alcoholic HCl to precipitate a colorless amorphous solid which is collected after 1 hour (under $N_2$), washed with ether, and dried in vacuo; wt., 2.9 g.; M.P. 147° (foaming); s. 72°. Crystallization from 20 ml. of isopropyl alcohol gives 1.7 g. of colorless material; M.P. 167–169° (foaming). Microanalysis indicates the formation of the dihydrochloride, solvated with isopropyl alcohol.

EXAMPLE 5

2 - acetyl - 4 - [3 - (dimethylamino)propyl]-3,4-dihyro-3-phenyl-2H-1,4-benzothiazine, methyloxime, fumaric acid salt, hydrate Interaction of 19.0 g. of 2-acetyl-4-[3-(dimethylamino) propyl] - 3,4 - dihydro - 3 - phenyl - 2H-1,4-benzothiazine with 9.0 g. of methoxyamine in 65 ml. of pyridine in the manner described in Example 2 gives the hydrochloride salt. The latter is converted to the free base (18 g.) and purified as an oxalic acid salt to give 12.3 g. of the oxalate, M.P. 185–187° (dec., crystallized from acetonitrile). The latter is converted to the free base and then to the fumaric acid salt which weighs 7.8 g., M.P. 155–157° (from acetonitrile).

EXAMPLE 6

2-(1 - acetylaminoethyl) - 4 - [3-dimethylamino)propyl]-3,4-dihydro-3-phenyl-2H-1,4-benzothiazine, hydrochloride A solution of the free base of Example 4 in chloroform is treated with an equivalent quantity of acetyl chloride and the resulting mixture refluxed for 1 hour. Removal of the solvent yields the title compound.

EXAMPLE 7

2-(1 - ethylaminoethyl) - 4 - [3-(dimethylamino)propyl]-3,4-dihydro - 3 - phenyl-2H-1,4-benzothiazine, dihydrochloride A solution of the free base of Example 6 in THF is reacted with $LiAlH_4$ according to the procedure used in Example 4 to give the title product.

EXAMPLE 8

2 - [1 - (N - acetyl-N-ethyl)aminoethyl]-4-[3-(dimethylamino)propyl] - 3,4 - dihydro - 3-phenyl-2H-1,4-benzothiazine, hydrochloride A solution of the free base of Example 7 in chloroform is treated with an equivalent quantity of acetyl chloride and the resulting solution refluxed for 1 hour. The solvent is removed under reduced pressure to give the title product.

EXAMPLE 9

2-[1 - (diethylamino)ethyl] - 4 - [3-(dimethylamino)propyl] - 3,4 - dihydro - 3 - phenyl - 2H-1,4-benzothiazine, dihydrochloride A solution of the free base of Example 8 is reacted with $LiAlH_4$ according to the procedure used in Example 4 to give the title product.

EXAMPLE 10

2 - [1 - (dimethylamino)ethyl] - 4 - [3-dimethylamino)propyl]-3,4-dihydro-3-phenyl-2H-1,4-benzothiazine A solution of the free base of Example 4 is treated with excess formic acid and formaldehyde solution. The mixture is heated on a steam bath for 8 hours and the solvent removed under reduced pressure. The residue is basified with NaOH solution and the product extracted with ether. After drying over $MgSO_4$, the ether solution is concentrated to give the product.

EXAMPLES 11–26

Reacting the compound of formula II–1 wherein the substituent X (in the 5-, 6-, 7- or 8-position) is as indicated below with hydroxylamine hydrochloride according to the procedure of Example 1 yields the corresponding oxime compound of formula Ia.

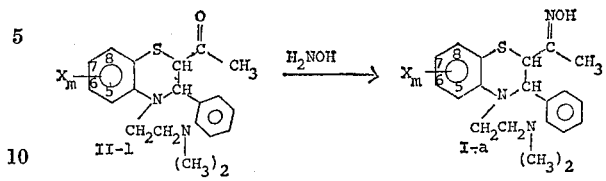

| Example: | X | | | |
|---|---|---|---|---|
| | 5 | 6 | 7 | 8 |
| 11 | H | F | H | H |
| 12 | H | H | H | Cl |
| 13 | H | H | Br | H |
| 14 | H | H | $CH_3$ | H |
| 15 | H | H | H | $C_2H_5$ |
| 16 | H | $CF_3$ | H | H |
| 17 | H | H | n-$C_6H_{13}$ | H |
| 18 | OH | H | H | H |
| 19 | H | $SC_2H_5$ | H | H |
| 20 | H | H | H | $NO_2$ |
| 21 | H | $SO_2CH_3$ | H | H |
| 22 | H | H | $OCF_3$ | H |
| 23 | H | $SCF_3$ | H | H |
| 24 | H | $NH_2$ | $CH_3$ | H |
| 25 | $OCH_3$ | $OCH_3$ | H | H |
| 26 | H | H | $N(CH_3)_2$ | H |

EXAMPLES 27–71

The procedure of Example 1 is repeated except that in the starting compound of formula II–1, the substituents R, Ar and alk-B are as indicated below. The final product of formula Ia is correspondingly substituted.

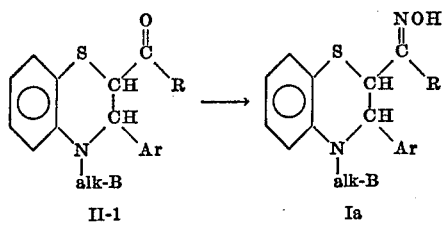

| Ex. | R | Ar | alk-B |
|---|---|---|---|
| 27 | —$C_3H_7$ | (phenyl with CH_3) | 2-(amino)ethyl chloride. |
| 28 | —$C_6H_{11}$ | (phenyl with $CH_3$) | 2-(methylamino)ethyl chloride. |
| 29 | —$C_8H_{17}$ | (phenyl with Cl) | 2-(diethylamino)ethyl chloride. |
| 30 | (pyridyl-N) | (thienyl-S) | 2-methyl-3-(dimethylamino)propyl chloride. |
| 31 | (cyclohexyl) | (furyl-O) | 6-(dimethylamino)hexyl chloride. |
| 32 | (pyridyl-N) | (phenyl with OH) | 2-[N-methyl-N-(2-hydroxyethyl)amino]ethyl. |
| 33 | —$CH_2$—(phenyl) | (pyridyl-N) | 2-[bis-N-(2-hydroxyethyl)amino]ethyl chloride. |
| 34 | (thienyl-S) | (pyridyl-N) | 3-(benzylamino)propyl chloride. |

TABLE—Continued

| Ex. | R | Ar | alk-B |
|---|---|---|---|
| 35 | furyl (O) | -C6H4-NH2 | 3-(N-phenethyl-N-methylamino)propyl chloride. |
| 36 | naphthyl | -C6H4-NH2 (NH2 ortho) | 2-(piperidino)ethyl chloride. |
| 37 | naphthyl | -C6H4-CH3 (H3C ortho) | 2-(2-methylpiperidino)ethyl chloride. |
| 38 | -C6H4-CH3 | -C6H4-Cl | 2-(2,6-dimethylpiperidino)ethyl chloride. |
| 39 | -C6H4-Br | -C6H4-Cl | 2-(2-ethoxypiperidino)propyl chloride. |
| 40 | CH(CH3)2 | -C6H4-Br | 2-(hexamethyleneamino)propyl. |
| 41 | C(CH3)3 | -C6H4-Br | 2-(2-piperidyl)ethyl. |
| 42 | -C6H5 | -C6H4-Br | 3-(3-piperidyl)propyl. |
| 43 | C2H5-C6H4- | -C6H4-NO2 | 2-(4-piperidyl)ethyl. |
| 44 | CH2CH(CH3)-C6H4- | -C6H4-NO2 | 2-(1-methyl-2-piperidyl)ethyl. |
| 45 | CH2CH(CH3)CH(CH3)CH3 | -C6H4-NO2 | 3-(1-methyl-3-piperidyl)propyl. |
| 46 | cyclopentyl | -C6H4-OCH3 | 4-(1-methyl-4-piperidyl)butyl. |
| 47 | cyclopropyl | -C6H4-NH2 | 3-(pyrrolidino)propyl. |
| 48 | -C6H10-CH3 (cyclohexyl-methyl) | naphthyl | 2-(2-methylpyrrolidino)ethyl. |
| 9 | CH2CH(CH3)2 | -C6H4-OH | 2-(2,5-dimethylpyrrolidino)ethyl chloride. |
| 50 | -C6H13 | -C6H4-OCF3 | 3-(3-ethoxypyrrolidino)propyl |
| 51 | -C8H17 | -C6H4-CF3 | 2-(2-pyrrolidyl)ethyl. |
| 52 | pyridyl | -C6H4-CH3S | 2-(3-pyrrolidyl)ethyl. |
| 53 | cyclohexyl | -C6H4-SO2C2H5 | 2-(N-methyl-2-pyrrolidyl)ethyl. |

TABLE—Continued

| Ex. | R | Ar | alk-B |
|---|---|---|---|
| 54 | pyridyl | phenyl-NHCOCH₃ | 3-(N-methyl-3-pyrrolidyl)propyl. |
| 55 | —CH₂—phenyl | phenyl (NHCH₃) | 2-(morpholino)ethyl. |
| 56 | thienyl (S) | phenyl-N(C₂H₅)₂ | 3-(2-methylmorpholino)propyl. |
| 57 | furyl (O) | phenyl-SCF₃ | 3-(2,6-dimethylmorpholino)propyl. |
| 58 | decalinyl | phenyl (CH₃) | 3-(3-methoxymorpholino)propyl. |
| 59 | naphthyl | phenyl-CH₃ | 2-(thiamorpholino)ethyl. |
| 60 | methylphenyl (CH₃) | phenyl-Cl | 3-(piperazino)ethyl. |
| 61 | bromophenyl (Br) | phenyl (O—CH₂—CH₂—O) | 3-(4-methylpiperazino)propyl. |
| 62 | CH(CH₃)₂ | phenyl (CH₃, CH₃) | 3-(4-cyclohexylpiperazino)propyl. |
| 63 | cyclopentyl | phenyl-OH | 3-(4-phenylpiperazino)propyl. |
| 64 | —CH₂CH₂CH₂—phenyl | phenyl-OH | 2-(4-benzylpiperazino)ethyl. |
| 65 | C₅H₁₁ | phenyl-OH | 3-(4-phenethylpiperazino)propyl. |
| 66 | CH₂C(CH)₂CH(CH₃)₂ | phenyl-NH₂ | 3-[4-dimethylaminoethyl)piperazino]propyl. |
| 67 | methylcyclopentyl (CH₃) | phenyl-NH₂ | 3-(2-methylpiperazino)propyl. |
| 68 | CH₃ | phenyl (H₃C) | 3-(2,6-dimethylpiperazino)propyl. |
| 69 | CH₃ | phenyl-Cl | 3-(3-methoxypiperazino)propyl. |
| 70 | CH₃ | phenyl-Cl | 2-(morpholino)ethyl. |
| 71 | CH₃ | phenyl (O—CH₂—O) | 3-(piperazino)ethyl. |

EXAMPLE 72

2-acetyl-4-[2-(dimethylamino)ethyl]-3,4-dihydro-3-phenyl-2H-1,4-benzothiazine-1-oxide, oxime, hydrochloride 2 - acetyl - 4-[2-(dimethylamino)ethyl]-3,4-dihydro-3-phenyl-2H-benzothiazine is converted to the corresponding sulfoxide by treatment with a chloroform solution containing one equivalent of m-chloroperbenzoic acid for two hours at room temperature. The sulfoxide is recovered and treated according to the procedure of Example 1 to yield the title product.

EXAMPLE 73

2-acetyl-4-[2-(dimethylamino)ethyl]-3,4-dihydro-3-phenyl-2H-1,4-benzothiazine-1,1-dioxide, oxime, hydrochloride The starting material from Example 72 is converted to the corresponding sulfone by refluxing with two equivalents of a chloroform solution of m-chloroperbenzoic acid. The sulfone is recovered and treated accoding to the procedure of Example 1 to yield the title product.

EXAMPLES 74–90

Following the procedure of Example 72 but employing as starting material the compound of formula II–1 of Examples 11–26, respectively, the corresponding oxime is obtained.

EXAMPLES 91–107

Following the procedure of Example 73 but employing as starting material the compound of formula II–1 of Examples 11–26, respectively, the corresponding oxime is obtained.

EXAMPLES 108–153

Following the procedure of Example 72 but employing as starting material, respectively, the compound of Examples 27–71, the corresponding oxime is obtained.

EXAMPLES 154–199

Following the procedure of Example 73 but employing as starting material, respectively, the compound of Examples 27–71, the corresponding oxime is obtained.

EXAMPLE 200

2-acetyl-4-[2-(dimethylamino)ethyl]-3,4-dihydro-3-phenyl-2H-1,4-benzothiazine, oxime, N-oxide A solution of the free base of Example 1 in acetonitrile is treated with two equivalents of H$_2$O$_2$ in acetic acid and the solution allowed to stand at room temperature for 8 hours. The solvent is removed to give the title product.

EXAMPLE 201

2-acetyl-4-[2-(dimethylamino)ethyl]-3,4-dihydro-3-phenyl-2H-1,4-benzothiazine, oxime, methobromide A solution of the free base of Example 1 in acetonitrile is treated with two equivalents of methyl bromide and the solution allowed to stand at room temperature for 8 hours. The solvent is removed to give the title product.

EXAMPLE 202

The following ingredients are thoroughly mixed in a Hobart blender:

|  | G. |
|---|---|
| 2 - acetyl-4-[2-(dimethylamino)ethyl]-3,4-dihydro-3 - phenyl-2H-1,4-benzothiazine, oxime, hydrochloride | 15.0 |
| Corn starch | 16.9 |
| Lactose | 120.0 |
| Magnesium stearate | 1.5 |
| Avicel (microcrystalline cellulose) | 33.8 |

The blended mixture is then compressed into tablets in normal manner to make 300 tablets each containing 50 mg. of active ingredient.

What is claimed is:

1. A compound of the formula

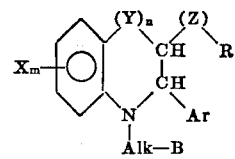

wherein

X is hydrogen, halogen, alkyl, haloalkyl, alkoxy, haloalkoxy, hydroxy, alkylthio, haloalkylthio, nitro, alkylsulfonyl, amino, alkanoylamino, or mono- or dialkylamino wherein any of the foregoing alkyl or substituted alkyl radicals may contain up to 8 carbon atoms;

m is 1, 2, 3 or 4;

Y is —S—, —SO—, or —SO$_2$—;

n is 1;

alk is a straight or branched alkyl radical of up to 6 carbon atoms;

B is a basic nitrogen containing radical selected from the group consisting of amino; (lower alkyl)amino; di(lower alkyl)amino; (hydroxy lower alkyl)amino; (hydroxy lower alkyl) (lower alkyl)amino; di(hydroxy lower alkyl)amino; phenyl(lower alkyl)amino; N-phenyl lower alkyl (lower alkyl)amino; piperidino; (lower alkyl) piperidino; (di(lower alkyl)piperidino; (lower alkoxy) piperidino; homopiperidino; 2-, 3-, or 4- piperidyl; 2-, 3-, or 4-(N-lower alkylpiperidyl); pyrrolidino; (lower alkyl)pyrrolidino; di(lower alkyl)pyrrolidino; (lower alkoxy)pyrrolidino; 2- or 3-pyrrolidyl; 2- or 3-(N-lower alkyl pyrrolidyl); morpholino; (lower alkyl)morpholino; di(lower alkyl)morpholino; (lower alkoxy) morpholino; thiamorpholino; (lower alkyl)thiamorpholino, di(lower alkyl) thiamorpholino; (lower alkoxy)thiamorpholino; piperazino; 4-R-subsituted piperazino; di(lower alkyl)amino-(lower alkyl)piperazyl; (lower alkyl)piperazino; di(lower alkyl) piperazino; (lower alkoxy)piperazino; homopiperazino; and 4-R-substituted homopiperazino; the lower alkyl and substituted lower alkyl radicals in the substituent B contain up to 6 carbon atoms;

R is straight or branched alkyl radical of from 1 to 8 carbon atoms, phenyl, X-substituted phenyl wherein X is an defined above, pyridyl, thienyl, furyl, naphthyl or alkylenedioxyphenyl, benzyl, phenethyl, isopropylphenyl, 3-phenylpropyl, or isopropylbenzyl;

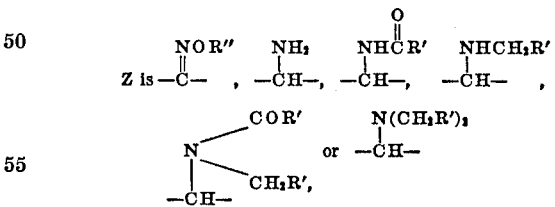

wherein R″ is hydrogen, alkyl of from 1–4 carbons or alkanoyl of from 1–4 carbons;

R′ is hydrogen or alkyl of from 1 to 4 carbons;

Ar is phenyl, X-substituted phenyl, wherein X is as defined above, pyridyl, thienyl, furyl, naphthyl, or alkylenedioxyphenyl;

and pharmaceutically acceptable acid-addition or quaternary ammonium salts thereof and N-oxides and pharmaceutically acceptable acid-addition salts thereof.

2. A compound according to claim 1 wherein Y is sulfur and n is 1.

3. A compound according to claim 1 wherein Y is sulfoxide and n is 1.

4. A compound according to claim 1 wherein Y is sulfonyl and n is 1.

5. A compound according to claim 1 having the name 2-acetyl-4-[2-(dimethylamino)ethyl]-3,4-dihydro-3-phenyl-2H-1,4-benzothiazine, oxime.

6. A compound according to claim 1 having the name 2-acetyl-4-[2-(dimethylamino)ethyl]-3,4-dihydro-3-phenyl-2H-1,4-benzothiazine, methyloxime.

7. A compound according to claim 1 having the name 2 - acetyl - 4 - [3-(dimethylamino)propyl]-3,4-dihydro-3-phenyl-2H-1,4-benzothiazine, oxime.

8. A compound according to claim 1 having the name 2-(1-aminoethyl)-4-[3-(dimethylamino)propyl]-3,4-dihydro-3-phenyl-2H-1,4-benzothiazine.

9. A compound according to claim 1 having the name 2 - acetyl - 4 - [3-(dimethylamino)propyl]-3,4-dihydro-3-phenyl-2H-1,4-benzothiazine, methyloxime.

References Cited
UNITED STATES PATENTS
3,746,706   7/1973   Krapcho _____ 260—243

JOHN M. FORD, Primary Examiner

U.S. Cl. X.R.
424—246; 260—244 R, 243 B, 239 BB, 288 A, 287 R, 326.11, 294.8 D, 295 F, 296 B, 332.2 R, 327 B, 332.3 P, 346.1 R, 347.2, 347.3, 347.7

UNITED STATES PATENT OFFICE
CERTIFICATE OF CORRECTION

Patent No. 3,812,114    Dated    May 21, 1974

Inventor(s)  John Krapcho

It is certified that error appears in the above-identified patent and that said Letters Patent are hereby corrected as shown below:

Column 1, line 32, "$-\overset{\text{NOR''}}{\underset{|}{C}}-$" should read -- $-\overset{\text{NOR''}}{\underset{\|}{C}}-$ --.
Column 2, line 37, insert a comma after "Y".
Column 3, formula II-1, "$\underset{CH}{\diagdown}\overset{O}{\underset{\|}{C}}\diagdown R$" should read -- $\underset{CH}{\diagdown}\overset{O}{\underset{\|}{C}}\diagdown R$ --.
Column 4, line 29, delete "a" and insert --Y is--.
Column 5, line 8, "methtylamino" should read --methylamino--.
Columns 9, 10, 11, and 12, examples 27, 28, 29, 30, 31, 33, 34, 35, 36, 37, 38 and 39, in the last column, delete "chloride".
Column 13, example 66, "$CH_2C(CH)_2CH(CH_3)_2$" should read --$CH_2C(CH_3)_2CH(CH_3)_2$--.

Column 16, line 27, delete the "(" before "di".

Signed and sealed this 15th day of October 1974.

(SEAL)
Attest:

McCOY M. GIBSON JR.
Attesting Officer

C. MARSHALL DANN
Commissioner of Patents